US008956079B2

(12) United States Patent
Roodenburg et al.

(10) Patent No.: US 8,956,079 B2
(45) Date of Patent: Feb. 17, 2015

(54) TUBULAR INSTALLATION SYSTEM AND METHOD

(75) Inventors: Joop Roodenburg, Delft (NL); Terence Willem August Vehmeijer, The Hague (NL); Jurjen Rinnert Haitsma, Rotterdam (NL)

(73) Assignee: ITREC B.V., Schiedam (NL)

( * ) Notice: Subject to any disclaimer, the term of this patent is extended or adjusted under 35 U.S.C. 154(b) by 25 days.

(21) Appl. No.: 13/995,842

(22) PCT Filed: Dec. 21, 2011

(86) PCT No.: PCT/NL2011/050874
§ 371 (c)(1),
(2), (4) Date: Aug. 8, 2013

(87) PCT Pub. No.: WO2012/091560
PCT Pub. Date: Jul. 5, 2012

(65) Prior Publication Data
US 2013/0315674 A1   Nov. 28, 2013

Related U.S. Application Data

(60) Provisional application No. 61/427,653, filed on Dec. 28, 2010.

(51) Int. Cl.
*F16L 1/19*   (2006.01)
*E21B 19/15*   (2006.01)
*F16L 1/20*   (2006.01)

(52) U.S. Cl.
CPC ............... *F16L 1/19* (2013.01); *E21B 19/155* (2013.01); *F16L 1/207* (2013.01)
USPC .......................................... 405/169; 405/170

(58) Field of Classification Search
USPC ............ 405/158, 168.4, 169, 170; 414/745.4, 414/745.7, 745.8
See application file for complete search history.

(56) References Cited

U.S. PATENT DOCUMENTS

| 5,421,675 | A  | * | 6/1995 | Brown et al. .................. 405/170 |
| 6,398,457 | B2 | * | 6/2002 | Baugh .............................. 405/170 |
| 7,189,028 | B1 | * | 3/2007 | Signaroldi et al. ............ 405/166 |
| 7,744,311 | B2 | * | 6/2010 | Vergouw et al. .............. 405/170 |
| 2002/0021943 | A1 | * | 2/2002 | Frijns ............................. 405/170 |

FOREIGN PATENT DOCUMENTS

| EP | 1 696 163 A1 | 8/2006 |
| WO | WO 2005/085692 A1 | 9/2005 |
| WO | WO 2006/038790 A1 | 4/2006 |
| WO | WO 2007/108673 A1 | 9/2007 |
| WO | WO 2009/153352 A1 | 12/2009 |

* cited by examiner

*Primary Examiner* — Tara M. Pinnock
(74) *Attorney, Agent, or Firm* — Birch, Stewart, Kolasch & Birch, LLP (57) ABSTRACT

The present invention relates to a tubular installation system (10) for J-laying tubulars comprising a J-lay tower structure (100), a tubulars supply system and a loader device (20) comprising tubular grippers (21*a-c*) and a boom (24) for transporting a tubular, an accessory supply system (200, 201, 202) and accessory handling means (29) for transporting an accessory between the essentially horizontal accessory supply position and the firing line. According to the invention, the accessory handling means (29) are distinct from the tubular grippers (21*a-c*) and are attached to the boom (24) of the loader device, at a different position than the tubular grippers, such that the loader device can be used as desired for transporting a tubular or an accessory between the respective supply position and the firing line.

20 Claims, 6 Drawing Sheets

TUBULAR INSTALLATION SYSTEM AND METHOD

CROSS-REFERENCE TO RELATED APPLICATIONS

This application is the National Phase of PCT/NL2011/050874 filed on Dec. 21, 2011, which claims priority under 35 U.S.C. 119(e) to U.S. Provisional Application No. 61/427,653 filed on Dec. 28, 2010, all of which are hereby expressly incorporated by reference into the present application.

A first aspect of the invention relates to a tubular installation system for J-laying a tubular.

Such a system commonly comprises:
- a J-lay tower structure for lowering and/or raising a tubular or an accessory along a firing line extending along the tower;
- a support for supporting the J-lay tower structure;
- a tubulars supply system, preferably provided on the support, for supplying tubulars to an essentially horizontal tubular supply position in the vicinity of the tower,
- a loader device for transporting a tubular between the essentially horizontal supply position and the firing line, wherein the loader device comprises:
  - a tubular gripper adapted for gripping the tubular,
  - a base, preferably provided on the support,
  - a boom to which the one or more tubular grippers are attached, which boom is pivotable with respect to the base in a boom pivot direction about a horizontal boom pivot axis, between a lowered position for gripping a tubular in an essentially horizontal tubular supply position, and a raised position for delivering a tubular to the firing line and vice versa;
- an accessory supply system, preferably provided on the support, for supplying an accessory to an essentially horizontal accessory supply position in the vicinity of the tower,
accessory handling means for transporting the accessory between the essentially horizontal accessory supply position and the firing line.

Known tubular installation systems for J-laying tubulars are provided on drilling rigs. On drilling rigs the tower comprises a drilling rig structure, and a lift device for raising and lowering a string of interconnected tubulars.

Other known tubular installation systems for J-laying tubulars are provided on marine pipelay systems, wherein the tower is a pipelay tower. Possibly, support for the tower is formed by the deck of a pipelay vessel.

According to a first aspect of the invention, the accessory handling means are distinct from the tubular grippers and are attached to the boom of the loader device, at a different position than the tubular grippers, such that the loader device can be used as desired for transporting a tubular or an accessory between the respective supply position and the firing line. Thus, a common loader device is used both for transporting a tubular between an essentially horizontal tubular supply position and a firing line extending along the tower and for transporting an accessory between an essentially horizontal accessory supply position and the firing line.

An advantage of a common loader device is the reduced footprint of the tubular and accessory handling system. In addition, the hoist capacity of raising tubulars and raising accessories can be shared.

The invention requires that the loader device can both transfer tubulars from the raised position of the boom into the firing line and vice versa, and transfer an accessory from the raised position of the boom into the firing line and vice versa.

As the same boom is used to bring the tubulars and the accessory in the raised position, the tubular grippers should be able to bring the tubulars into the firing line taking into account the presence of the accessory handling means, and on the other hand, the accessory handling means should be able to bring the accessories into the firing line, taking into account the presence of the tubular grippers.

Preferably, J-lay tower bearing means are provided which allow for the pivoting of the J-lay tower structure with respect to the support about at least one J-lay tower pivot axis; the J-lay tower pivot axis defining a first and second side of the J-lay tower structure, extending perpendicular to the J-lay tower pivot axis.

Preferably, the base of the loader device is provided adjacent the tower. When a tiltable J-lay tower structure is provided, adjacent the tower can be defined in that the boom pivot axis is essentially parallel to the J-lay tower pivot axis, and in that the boom pivot axis is provided adjacent the first and/or second side of the J-lay tower structure.

In principle, it is possible to provide the accessory handling means closest to the tower and the tubular grippers next to the accessory handling means, more remote from the tower. Then, the tubular grippers need to translate the tubulars quite a distance, past the accessory handling means, from and into the firing line. It is preferred to provide the tubular grippers closest to the tower and the accessory handling means next to the tubular grippers, more remote from the tower. Thus, the accessory handling means need to translate the accessory past the tubular grippers.

In a preferred embodiment, the accessory handling means comprise accessory rails attached to the boom of the loader device, and the tower is provided with tower rails. In this preferred embodiment, the accessory rails adjoin the tower rails in the raised position of the loader device, such that the accessory can be transferred from the accessory handling means via the accessory rails and the tower rails to the firing line. Thus, the accessory rails and the tower rails allow transfer of the accessory from the raised position of the boom into the firing line and vice versa.

Preferably, the one or more tubular grippers are pivotably attached to the boom about a gripper rotation axis essentially parallel to the boom, which one or more grippers are preferably pivoted by one or more hydraulically actuated cylinders. As such, the tubular grippers can translate the tubulars between the raised position of the boom in the direction of the firing line. Possibly the tubular grippers are capable of positioning the tubulars into the firing line.

Alternatively, when the tower is provided with tower rails, the tubular grippers position the tubulars next to the firing line, into the tower, adjacent the tower rails. As such, the tubular grippers adjoin the tower rails in the raised position of the loader device, such that the tubulars can be transferred between the tubular grippers and the firing line via the tower rails. Thus, the tower rails allow transfer of the tubular from the raised position of the boom into the firing line and vice versa.

With the one or more tubular grippers being pivotably attached to the boom, this allows the tubular grippers to be pivoted away from the accessory rails provided on the boom, so as to allow the accessory to be transferred across the accessory rails and the tower rails to the firing line, without being hindered by the tubular grippers.

Even more preferably, the accessory handling means comprise an accessory handling frame to which the accessory is attached, which accessory handling frame is allowed to move over the accessory rails and the tower rails. Possibly, the tower is provided with the accessory line-up tool. Without any accessory present, and at the lowered position of the boom, the accessory handling frame is provided at a departure position on the boom, corresponding to the horizontal accessory supply position. As such, the accessory is supplied onto the accessory handling frame. After having brought the accessory into the firing line, the accessory handling frame is allowed to translate back across the tower rails and the accessory rails to the departure position, now at a raised position of the boom. The boom may be allowed to lower, to be prepared for future tubular/accessory transport.

In an alternative preferred embodiment, the accessory handling means comprise an accessory line-up tool to which the accessory is attached, which accessory line-up tool is allowed to move over the accessory rails and the tower rails. Without any accessory present, and at the lowered position of the boom, the accessory line-up tool is provided at a departure position on the boom, corresponding to the horizontal accessory supply position. Thus, the accessory is supplied to the line-up tool. The line-up tool with the accessory is subsequently raised by the boom, and translated across the accessory rails and the tower rails into the firing line. The accessory line-up tool lines up the accessory in the firing line.

A second aspect of the invention relates to a tubular installation system for J-laying tubulars.

Such a system commonly comprises:

A tubular installation system for J-laying tubulars wherein the system comprises:
- a J-lay tower structure for lowering and/or raising a tubular or an accessory along a firing line extending along the tower;
- a support for supporting the J-lay tower structure;
- a tubulars supply system, preferably provided on the support, for supplying tubulars to an essentially horizontal tubular supply position in the vicinity of the tower,
- a loader device for transporting a tubular between an essentially horizontal supply position and the firing line, wherein the loader device comprises:
    - a tubular gripper adapted for gripping the tubular,
    - a base, preferably provided on the support,
    - a boom to which the one or more tubular grippers are attached, which boom is pivotable with respect to the base in a boom pivot direction about a horizontal boom pivot axis, between a lowered position for gripping a tubular in the essentially horizontal tubular supply position, and a raised position for delivering a tubular to the firing line and vice versa,
- an accessory supply system, preferably provided on the support, for supplying an accessory to an essentially horizontal accessory supply position in the vicinity of the tower,
- accessory handling means for transporting the accessory between the essentially horizontal accessory supply position and the firing line.

In general, accessory supply systems are formed by cranes: e.g. a mast crane, or a travelling crane.

According to a second aspect of the present invention, the accessory supply system is improved in that it comprises accessory supply rails, provided on the support, which accessory supply rails are in line with the accessory handling means. As such, the accessory can be transferred, e.g. from a storage location, via the accessory supply rails directly to the accessory handling means, which can deliver the accessory to the firing line.

Preferably, the accessory handling means are pivotable about a horizontal accessory pivot axis between a lowered position for receiving the accessory in the essentially horizontal supply position and a raised position for delivering the accessory to the firing line and vice versa.

The accessory supply rails may be provided perpendicular to or parallel to the horizontal accessory pivot axis. Which option is the most advantageous depends on the general layout of the tubular and accessory handling system. When the system is provided on a vessel, it is advantageous to provide the accessory supply rails parallel to the to the longitudinal axis of the vessel, as in general there is more deck space available in the longitudinal direction of a vessel than in the transverse direction.

In a preferred embodiment of the second aspect of the invention, the accessory supply rails are provided perpendicular to and adjacent to the horizontal accessory pivot axis, and a removable bridging rail portion is provided essentially above the horizontal accessory pivot axis between the accessory supply rails and the accessory supply position, which bringing rail portion is removable in order to allow raising of the accessory handling means.

The bridging portion is preferably provided when the accessory is being transferred from the accessory supply rails to the accessory handling means, which are at the lowered position for receiving the accessory in the essentially horizontal accessory supply position. The accessory is than transferred, e.g. from a storage location, via the accessory supply rails and the bridging rail portion to the accessory supply position. Subsequently, the accessory handling means are to be pivoted to the raised position for delivering the accessory to the firing line and vice versa. This pivoting movement is not possible when the supply rails extend across the pivot axis, or when the accessory supply position is too close to the accessory pivot axis. The practical solution to this problem is thus found in the removal of the removable bridging rail portion.

In a preferred embodiment, the accessory handling means comprise a base, preferably provided on the support, and a pivotable accessory handling arm to which the accessory is attached, which accessory handling arm is pivotable with respect to the base in an accessory arm pivot direction about the horizontal accessory pivot axis. Hence, in this embodiment a loader device is provided for transporting tubulars and an accessory handling arm is provided for transporting the accessory.

Alternatively, the accessory handling means are distinct from the tubular grippers and are attached to the boom of the loader device, at a different position than the tubular grippers, such that the loader device can be used as desired for transporting a tubular or an accessory between the respective supply position and the firing line, such that the boom pivot axis coincides with the horizontal accessory pivot axis.

A third aspect of the present invention relates to a tubular installation system for J-laying tubulars wherein the system comprises:
- a support;
- a J-lay tower structure for lowering and/or raising a tubular or an accessory along a firing line extending along the tower;
- J-lay tower bearing means which allow for the pivoting of the J-lay tower structure with respect to the support about at least one J-lay tower pivot axis; the J-lay tower pivot axis defining a first and second side of the J-lay tower structure, extending perpendicular to the J-lay tower pivot axis;
- a tubulars supply system, preferably provided on the support, for supplying tubulars to an essentially horizontal tubular supply position in the vicinity of the tower, a loader device for transporting a tubular between an essentially horizontal supply position and the firing line, wherein the loader device comprises:
  a tubular gripper adapted for gripping the tubular,
  a base, preferably provided on the support,
  a boom to which the one or more tubular grippers are attached, which boom is pivotable with respect to the base in a boom pivot direction about a horizontal boom pivot axis, between a lowered position for gripping a tubular in the essentially horizontal tubular supply position, and a raised position for delivering a tubular to the firing line and vice versa,
an accessory supply system, preferably provided on the support, for supplying an accessory to an essentially horizontal accessory supply position in the vicinity of the tower,
accessory handling means adapted for handling the accessory, wherein the accessory handling means comprise a base, preferably provided on the support, and a pivotable accessory handling arm to which the accessory is attached, which accessory handling arm is pivotable with respect to the base in an accessory arm pivot direction about a horizontal accessory handling arm pivot axis, between a lowered position for receiving the accessory in an essentially horizontal accessory supply position, and a raised position for delivering the accessory to the firing line and vice versa.

Known loader devices for transporting tubulars and accessory handling means for handling tubulars are provided adjacent the tower, but generally at remote locations as both the loader device and the accessory handling means require quite a lot of space, and the tubulars supply system and the accessory supply system also need to be tuned to the respective locations.

According to the third aspect of the present invention, the boom pivot axis is essentially parallel to the accessory handling arm pivot axis and to the J-lay tower pivot axis, and wherein the boom pivot axis and the accessory handling arm pivot axis are provided adjacent the first and/or second side of the J-lay tower structure. Hence, both the boom and the accessory handing arm are positioned adjacent the tower, where it is common that one of these is positioned in line with the tower structure, to load the tubular/accessory into the front/rear side of the tower.

In a preferred embodiment, the accessory handing arm and the boom in their lowered positions point in the same direction. Thus, when both the boom and the accessory handing arm are in the lowered position for respectively receiving a pipe or an accessory, the free ends of the boom and the accessory handling arm, opposite the end attached to the respective bases, point in the same direction.

It is conceivable that the loader device and the accessory handling means are provided at opposite sides of the tower. Alternatively, and more preferably, both the loader device and the accessory handling means are provided at the same side of the tower, adjacent the tower. As such, a large reduction in total footprint of the tubular and accessory handling system can be achieved. In particular, as the loader device and the accessory handling means are now positioned close to each other, additional advantages can be achieved such as shared power supplies for pivoting the boom and the accessory handling arm.

With the loader device and the accessory handling means provided at the same side of the tower, the tubular grippers and the accessory handling means should both be able to bring the tubulars and accessories into the firing line, respectively, taking into account the presence of the accessory handling means and the tubular grippers, respectively.

In principle, it is possible to provide the accessory handling means closest to the tower and the loader device next to the accessory handling means, more remote from the tower. Then, the tubular grippers need to translate the tubulars quite a distance, past the accessory handling means, from and into the firing line. It is preferred to provide the tubular grippers closest to the tower and the accessory handling means next to the tubular grippers, more remote from the tower. Thus, the accessory handling means need to translate the accessory past the tubular grippers.

This practical problem can easily be solved by providing a small distance between the parallel boom pivot axis and accessory handling arm pivot axis. Yet alternatively, the boom pivot axis and the accessory handling arm pivot axis are essentially flush with each other. Possibly, the tower is tiltable about a horizontal tower pivot axis, which may optionally also essentially be in line with the boom pivot axis and the accessory handling arm pivot axis.

In a preferred embodiment, the accessory handling means comprise accessory rails attached to the accessory handling arm, and the tower is provided with tower rails. In this preferred embodiment, the accessory rails adjoin the tower rails in the raised position of the loader device, such that the accessory can be transferred from the accessory handling means via the accessory rails and the tower rails to the firing line. Thus, the accessory rails and the tower rails allow transfer of the accessory from the raised position of the boom into the firing line and vice versa.

Preferably, the one or more tubular grippers are pivotably attached to the boom about a gripper rotation axis essentially parallel to the boom, which one or more grippers are preferably pivoted by one or more hydraulically actuated cylinders. As such, the tubular grippers can translate the tubulars between the raised position of the boom and the firing line. Moreover, this allows the tubular grippers to be pivoted away from the accessory rails provided on the boom, so as to allow the accessory to be transferred across the accessory rails and the tower rails to the firing line, without being hindered by the tubular grippers.

Alternatively, when the tower is provided with tower rails, the tubular grippers position the tubulars next to the firing line, into the tower, adjacent the tower rails. As such, the tubular grippers adjoin the tower rails in the raised position of the loader device, such that the tubulars can be transferred between the tubular grippers and the firing line via the tower rails. Thus, the tower rails allow transfer of the tubular from the raised position of the boom into the firing line and vice versa.

Possibly, the accessory handling means comprise an accessory handling frame to which the accessory is attached, which accessory handling frame is allowed to move over the accessory rails and the tower rails. Possibly, the tower is provided with the accessory line-up tool. Without any accessory present, and at the lowered position of the boom, the accessory handling frame is provided at a departure position on the boom, corresponding to the horizontal accessory supply position. As such, the accessory is supplied onto the accessory handling frame. After having brought the accessory into the firing line, the accessory handling frame is allowed to translate back across the tower rails and the accessory rails to the departure position, now at a raised position of the boom. The boom may be allowed to lower, to be prepared for future tubular/accessory transport.

In an alternative preferred embodiment, the accessory handling means comprise an accessory line-up tool to which the accessory is attached, which accessory line-up tool is allowed to move over the accessory rails and the tower rails. Without any accessory present, and at the lowered position of the boom, the accessory line-up tool is provided at a departure position on the boom, corresponding to the horizontal accessory supply position. Thus, the accessory is supplied to the line-up tool. The line-up tool with the accessory is subsequently raised by the boom, and translated across the accessory rails and the tower rails into the firing line. The accessory line-up tool lines up the accessory in the firing line.

The above described tubular and accessory handling systems according to the various aspects of the invention may be provided on drilling rigs, wherein the tower comprises a drilling rig structure, and wherein a hoisting device is provided for raising and lowering a string of interconnected tubulars.

Alternatively, the above described tubular and accessory handling systems according to the invention may be provided on marine pipelay systems, wherein the tower is a pipelay tower. Possibly, support for the tower is formed by the deck of a pipelay vessel, preferably a monohull vessel.

The above described tubular and accessory handling systems according to the invention comprise a boom which is pivotable with respect to the base. This can e.g. be accomplished by a boom hoist tackle which is provided between the boom and the tower. Alternatively, the boom is pivotable with respect to the base by one or more hydraulically actuated cylinders.

In a preferred embodiment of the above described tubular and accessory handling systems according to the invention, the tower is tiltable and the loader device and the accessory handling means can transport respectively a tubular or an accessory between the respective essentially horizontal supply position and a raised position for delivering the tubular respectively the accessory to the firing line in the tilted tower.

In a preferred embodiment of the above described tubular and accessory handling systems according to the invention, the system is further provided with one or more of the following features:
 a tubular line-up tool for aligning the tubular in the tower, which tubular line-up tool is provided on the tower or on the loader device; which tubular line-up tool preferably comprises at least three clamps and is in particular suitable for clamping both pipes of a pipe-in-pipe construction;
 an accessory line-up tool for aligning the accessory in the tower, which accessory line-up tool is provided on the tower or on the loader device;
 a workstation provided below the tower, preferably provided on the support.

Preferably, the loader device of the above described tubular and accessory handling systems according to the invention is provided with a tubular stopper, which is provided in line with the one or more tubular grippers, in particular suitable for handling pipe-in-pipes.

The invention will be explained further with reference to the drawings, in which.

Figure 1A:
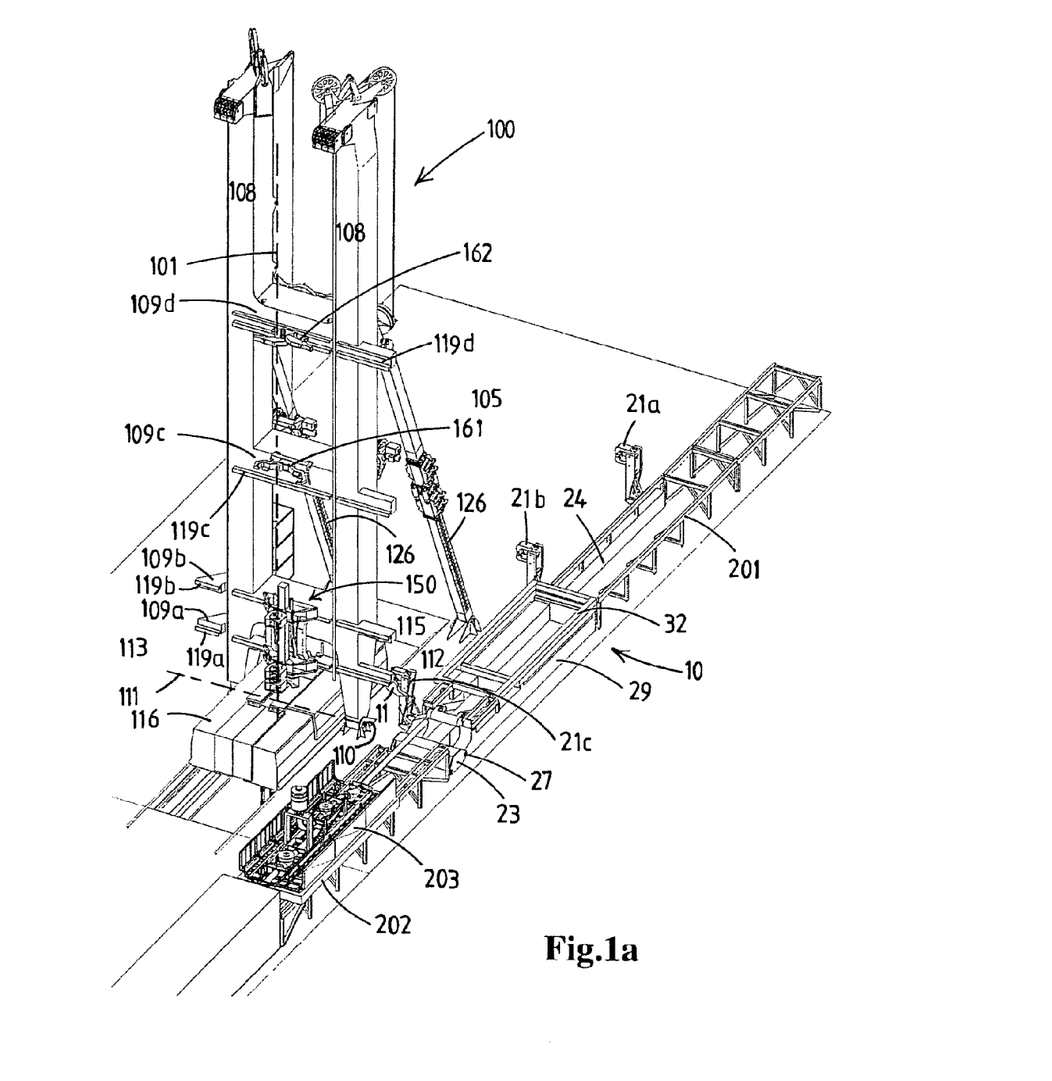
FIG. 1a shows a tubular installation system according to the present invention with the boom in the lowered position.
Figure 1B:
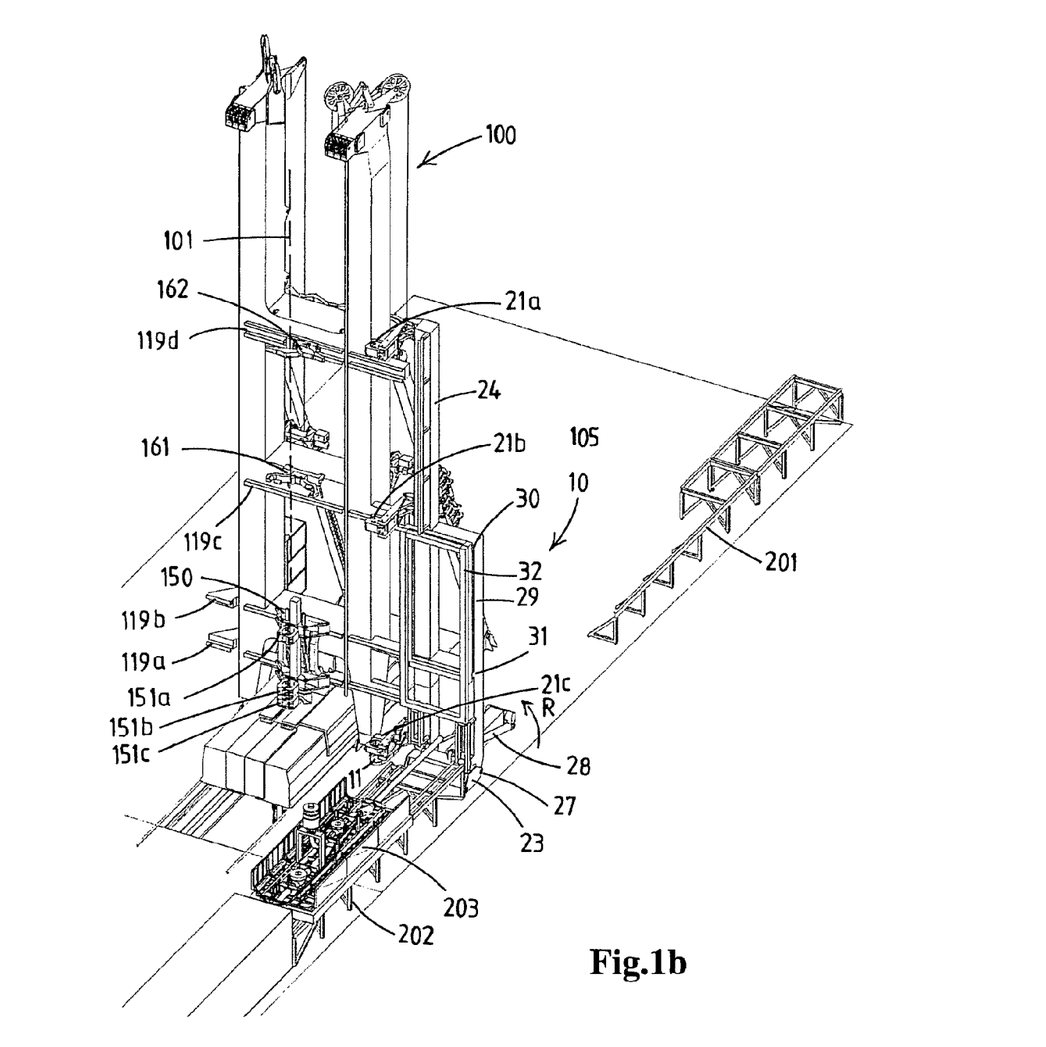
FIG. 1b shows the tubular installation system of FIG. 1a with the boom in the raised position.
Figure 2:
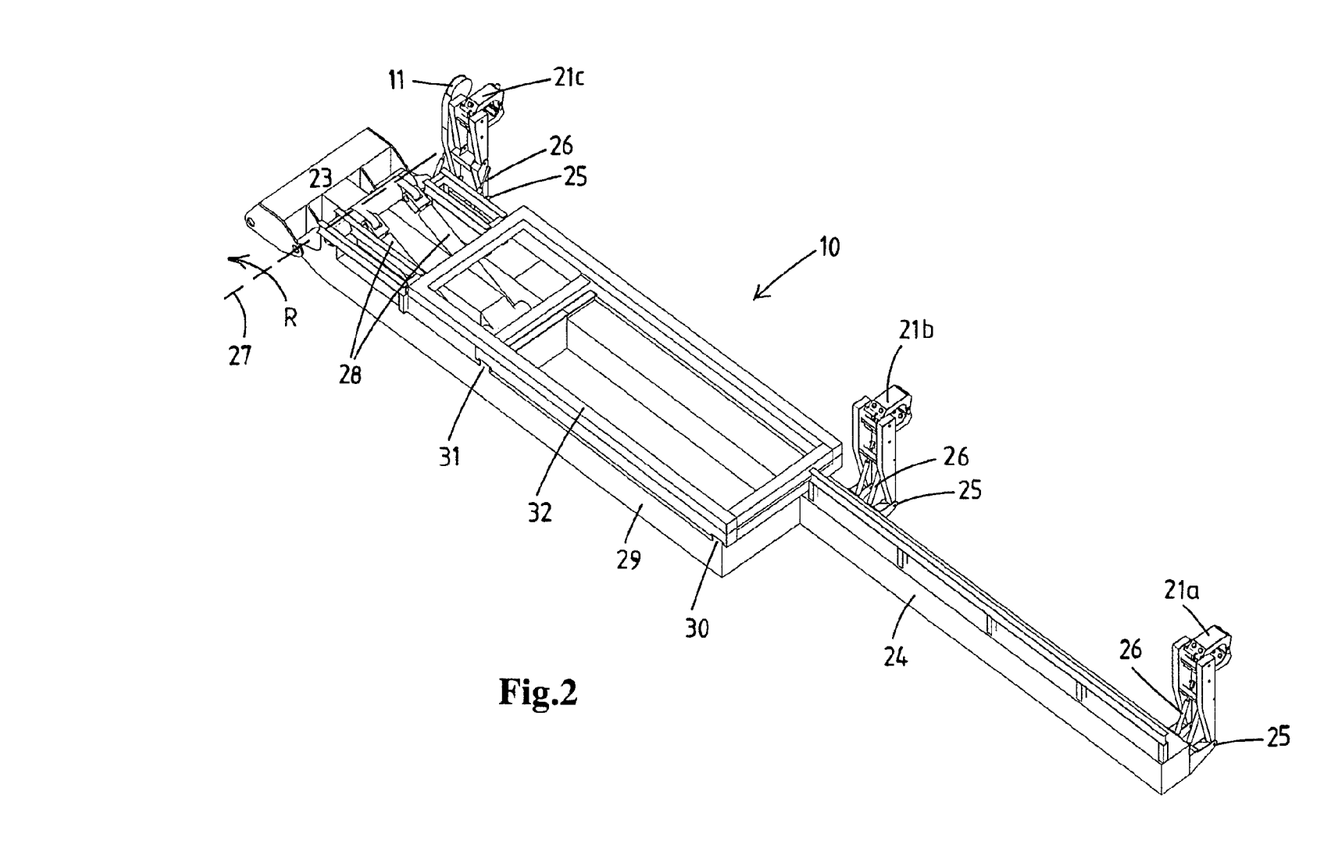
FIG. 2 shows a loader device according to the first aspect of the invention in a perspective view.

In FIGS. 1a and 1b a tubular installation system 10 for J-laying tubulars according to the first aspect of the invention is shown. The tubular and accessory handling system 10 is made for transporting a tubular between an essentially horizontal tubular supply position (FIG. 1a) and a firing line extending along the tower (FIG. 1b) and for transporting an accessory between an essentially horizontal accessory supply position (FIG. 1a) and the firing line (FIG. 1b). In FIG. 2, the tubular installation system 10 is shown in detail at an essentially horizontal supply position.

It is conceivable, but not necessary, that the horizontal accessory supply position corresponds to the horizontal tubular supply position. Small deviations in these positions are possible. In particular when the different character of a tubular supply system and an accessory supply system is considered, a small deviation is well conceivable.

In FIGS. 1a and 1b a J-lay tower structure 100 is visible for lowering and/or raising a tubular or an accessory along a firing line 101 extending along the tower. The firing line 101 is essentially vertical and parallel to the tower 100. Preferably, the firing line is provided adjacent the tower 100. The tower is provided on a support 105.

The support may be a deck of a vessel. The vessel may be of a monohull design, but other design (e.g. as a semi-submersible vessel, as converted drilling rig, etc) are also possible.

J-lay tower structure bearing means 110 are provided which allow for the pivoting of the J-lay tower structure with respect to the support about at least one J-lay tower pivot axis 111. The J-lay tower pivot axis 111 defines a first and second side 112, 113 of the J-lay tower structure, extending perpendicular to the J-lay tower pivot axis. Preferably, the J-lay tower pivot axis 111 extends at right angles to the centreline of a vessel.

According to the shown, preferred embodiment, at least one, here two telescopic members 126 are arranged between the support 105 and the tower 100 allow to adjust the inclination of the tower 100. In this example the inclination of the tower 20 can be varied in the range from 0 degrees to 40 degrees from vertical. When desired a smaller or broader range of tower inclination, or even a non-inclinable tower can be envisaged.

In this example the J-lay tower structure 100 comprises two spaced apart main vertical beams 108 interconnected by a number of horizontal crossbeams 109a, 109b, 109c, 109d.

In the shown embodiment, a moonpool 115 is provided in said support 105. The moonpool may be located on the centreline of a vessel and about centrally in relation to the length of the vessel. Above the moonpool 115, the J-lay tower structure 100 is provided, such that firing line 101 extends through said moonpool 115. Alternatively, the J-lay tower structure may also be provided at the bow, stern or side of a vessel, as a result of which the pipeline is launched over the bow, stern or side into the sea.

In a not-shown, non-preferred embodiment, the tower could have the form of a derrick (e.g. a latticed framework) extending over the moonpool, wherein the firing line or pipeline launch trajectory-passes within the structure of the derrick.

In this example the moonpool 115 is covered by a movable pipe section workstation 116. For instance the workstation is slideable across rails using associated hydraulic cylinders. Workstation 116 may comprise e.g. a coating and/or NDT station.

The pipelaying system according to the invention may further include a stationary or static pipeline support device (not visible), arranged in the lower portion of the firing line below the workstation 60 and adapted to support—on its own—the entire weight of the launched pipeline suspending towards the seabed.

Said pipeline support device (not shown) can be a stationary frictional clamp, having one or more clamping elements engaging on the pipeline, said clamping elements being stationary while supporting the pipeline and not being part of a track (as in a tensioner) so that the pipeline can not be moved using said stationary frictional clamp in the direction of the pipeline axis.

It could be that the stationary pipeline support device does allow for displacement essentially in a plane at right angles to the supported pipeline, possibly while supporting the load of the pipeline. In this respect "stationary" essentially means "stationary in the direction of the pipeline".

The pipeline support device is preferably embodied as a stationary hang-off clamp which can engage on the pipeline, e.g. having one or more support element engaging below a collar on the pipeline, and support the pipeline in a stationary manner. These hang-off clamps commonly include multiple mobile clamp parts allowing the clamp to be opened for release and passage of the pipeline and closed for support of the pipeline.

Preferably said a stationary or static pipeline support device is not supported by the tower, but on the hull of the vessel, e.g. via a hatch over the moonpool or otherwise, e.g. a sliding static pipeline support device mounted on the hull of the vessel. It is noted that the support device could be supported by the tower if desired.

Possibly, the pipeline support device is integrated in a hatch assembly or supported thereby, and the one or more hatch panels are adapted to support the weight of the launched pipeline when held by the device. The hang-off clamp may be composed of two mating clamp parts, each integrated in a hatch panel so that the pipeline can be held between in the clamp (e.g. a pipeline collar resting on said clamp parts) when the panels are in their closed position. The hatch may also include a pipeline funnel through which a pipeline may pass when laying pipeline with the hatch panels in closed position.

Tubular installation system 10 further comprises a tubulars supply system (not shown), preferably provided on the support, for supplying tubulars to an essentially horizontal tubular supply position in the vicinity of the tower.

A loader device 20 according to the invention is shown in FIGS. 1*a*, 1*b* and 2, comprising three tubular grippers 21*a*, 21*b*, 21*c*, and comprising a tubular stopper 11, which is provided in line with the one or more tubular grippers, in particular suitable for handling pipe-in-pipes.

The loader device 20 further comprises a base 23, mounted to the support 105, and a boom 24 to which the one or more tubular grippers are attached. In the shown embodiment, the grippers 21*a*-21*c* are pivotably attached to the boom 24 about a gripper rotation axis 25, essentially parallel to the boom 24, which grippers are pivotable by hydraulically actuated cylinders 26.

The boom 24 is pivotable with respect to the base 23 in a boom pivot direction R about a horizontal boom pivot axis 27, by means of hydraulic actuators 28. In FIG. 1*a* and 2 the boom is in a lowered position for receiving and gripping a tubular in the essentially horizontal tubular supply position. If pivoted in direction R, the boom is pivoted to a raised position for delivering the tubular 11 to the firing line (FIG. 1*b*).

The tubular installation system comprises an accessory supply system 200, provided on the support 105, for supplying an accessory to an essentially horizontal accessory supply position in the vicinity of the tower. The accessory supply system here comprises two sets of rails 201, 202, each extending in line with the loader device 20. On rails 202 a PLET 203 is provided. Advantageously, other accessories are supplied to the other rails 201.

The loader device 20 further comprises accessory handling means 29 for transporting an accessory (not shown) between the essentially horizontal accessory supply position and the firing line. As can be seen, the accessory handling means 29 are distinct from the tubular grippers 21, 22, and are also attached to the boom 24 of the loader device 20, at a different position than the tubular grippers 21, 22. In the shown embodiment, the accessory handling means are provided at an opposite side of the boom 24. The accessory supply rails 201, 202 extend in line with the accessory handling means 29 on the loader device 20.

According to the second aspect of the invention, the accessory supply rails 202 are provided adjacent the horizontal boom pivot axis 27, and a removable bridging rail portion (not shown) may be provided essentially above the horizontal boom pivot axis 27 between the accessory supply rails 202 and the accessory supply position.

According to the first aspect of the present invention, the loader device 20 can thus be used as desired for transporting a tubular or an accessory between the respective supply position and the firing line.

In the shown embodiment, the accessory handling means 29 comprise accessory rails 30, 31, which are attached to the boom 24 of the loader device 20. An accessory handling frame 32 is here provided, to which the accessory is attachable, which accessory handling frame 32 is allowed to move over the accessory rails 30, 31. Possibly, but not necessarily, the accessory handling frame 32 also functions as a line-up tool, to line up the accessory in the firing line.

In the shown embodiment, the tower is provided with tower rails 119*a*, 119*b*, 119*c* and 119*d*, provided on horizontal crossbeams 109*a*, 109*b*, 109*c*, 109*d*.

It is visible in FIG. 1*b* that the accessory rails 30, 31 adjoin the tower rails 119*c*, 119*b* respectively in the raised position of the loader device, such that the accessory, on the accessory handling frame 32, can be transferred via the accessory rails 31, 32 and the tower rails 119*c*, 119*b* into the firing line.

In FIGS. 1*a* and 1*b* a tubular line-up tool 150 is provided on tower rails 119*a*, 119*b*, and pipe gripping clamps 161, 162 on rails 119*c*, 119*d* respectively. This line-up tool 150 and clamps 161, 162 can take over a pipe from the tubular grippers 21*a*-21*c* in the raised position, and translate the tubulars from the side of the tower 100 into the firing line 101. Line-up tool 150 is capable of lining up the tubular with the launched tubulars, e.g. a pipeline, with the clamps 151*a*, 151*b*, 151*c*. In this embodiment, three clamps 151*a*-15*c* are provided to be able to handle pipe-in-pipes.

Figure 3A:
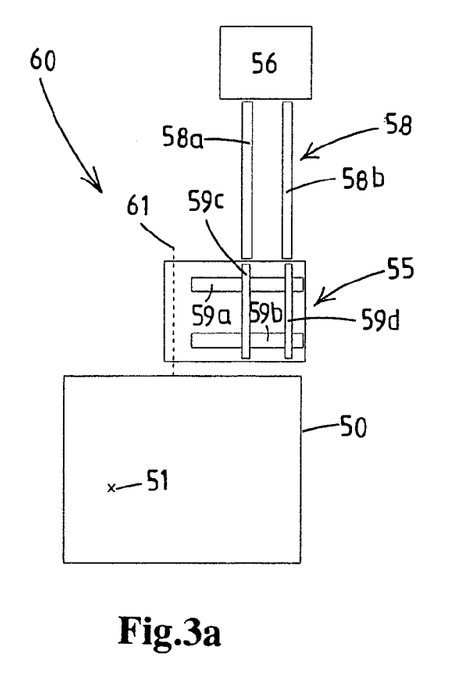
FIGS. 3a-3c show three alternative embodiments of the second aspect of the invention in a view from above.
Figure 3B:
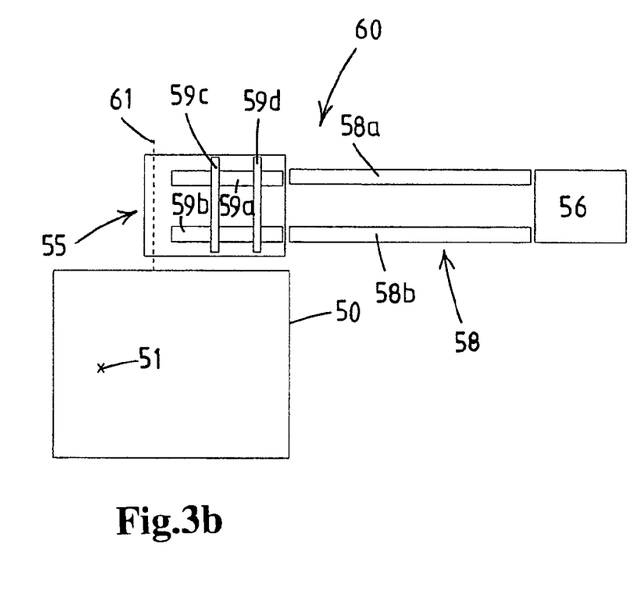
Figure 3C:
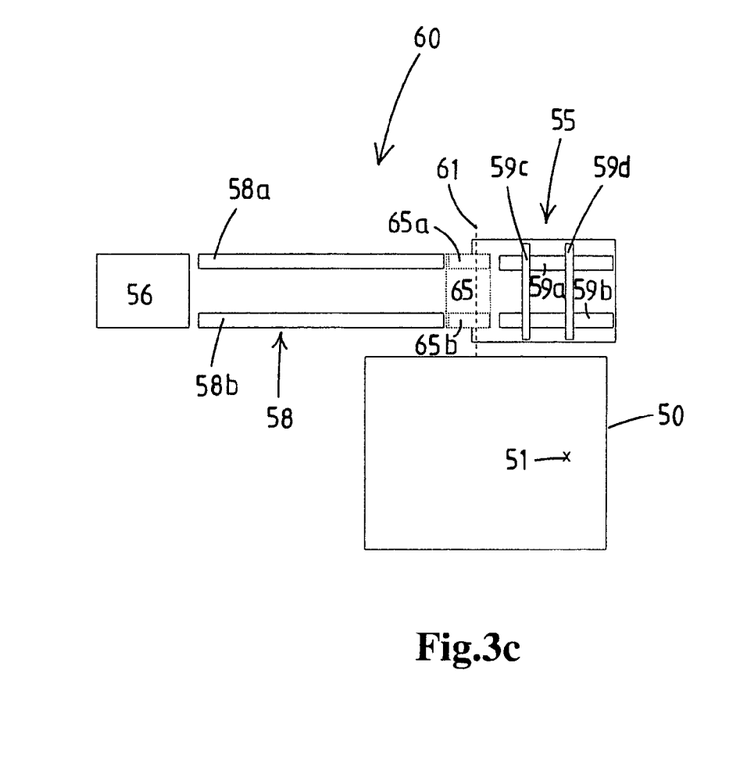

In FIGS. 3*a*-3*c* alternative embodiments of the second aspect of the invention are shown very schematically, in a view from above.

A tower 50 is shown with a firing line 51 extending along the tower. The tower is supported by a support (not shown), which is preferably a vessel, e.g. a pipelaying vessel. In the tower a lift device (not shown) is provided, for lowering and/or raising a tubular or a tubular provided with an accessory along the firing line.

A tubular and accessory handling system 60 is provided, for transporting a tubular between an essentially horizontal tubular supply position and the firing line 51, and for transporting an accessory between an essentially horizontal accessory supply position and the firing line.

Tubular and accessory handling system 60 comprises a tubulars supply system (not shown), preferably provided on the support, for supplying tubulars to an essentially horizontal tubular supply position in the vicinity of the tower, and a loader device (not shown) for transporting a tubular between the essentially horizontal supply position and the firing line.

The loader device (not shown), as a common tubular loader device comprises:
- a tubular gripper adapted for gripping the tubular,
- a base, preferably provided on the support,
- a boom to which the one or more tubular grippers are attached, which boom is pivotable with respect to the base in a boom pivot direction about a horizontal boom pivot axis, between a lowered position for gripping a tubular in the essentially horizontal tubular supply position, and a raised position for delivering a tubular to the firing line and vice versa.

Tubular and accessory handling system 60 further comprises an accessory supply system 58, preferably also provided on the support, for supplying an accessory 56 to an essentially horizontal accessory supply position in the vicinity of the tower 50.

Accessory handling means 55 are provided for handling the accessory 56. The accessory handling means 55 are pivotable about a horizontal accessory pivot axis 61 between a lowered position (as shown in FIGS. 2a-2c) for receiving the accessory in the essentially horizontal accessory supply position, and a raised position (not shown) for delivering the accessory 56 to the firing line 51 and vice versa. Preferably, the accessory handling means 55 comprise a base (not shown), preferably provided on the support, and a pivotable accessory handling arm to which the accessory is attached, which accessory handling arm is pivotable with respect to the base in an accessory arm pivot direction about the horizontal accessory pivot axis 61.

The shown accessory handling means 55 comprise accessory rails 59a, 59b, 59c, 59d. Possibly, but not shown, an accessory handling frame is provided, to which the accessory 56 is attachable, which accessory handling frame can be transferred across the accessory rails.

According to the second aspect of the invention, the accessory supply system 58 comprises accessory supply rails 58a, 58b, which are in line with the accessory handling means 55. The supply rails 58a, 58b are provided on the support. Because the accessory supply rails 58a, 58b are in line with the accessory handling means 55, transfer of the accessory from the accessory supply system to the accessory handling means is made easier. The accessory handling means should be able to receive an accessory from the supply rails. In the shown embodiment, this is accomplished by providing the accessory handling means with accessory rails, which are in line with the accessory supply rails.

In the embodiment in FIG. 2a, the accessory supply rails 58a, 58b are provided parallel to the horizontal accessory pivot axis 61. Alternatively, as shown in FIGS. 2b and 2c, the accessory supply rails 58a, 58b are provided perpendicular to the horizontal accessory pivot axis 61.

In the embodiment in FIG. 2c, the accessory supply rails 58a, 58b are also provided adjacent the horizontal accessory pivot axis 61, and a removable bridging rail portion 65 is provided essentially above the horizontal accessory pivot axis 61 between the accessory supply rails 58a, 58b and the accessory supply position. In the shown embodiment, the bridging rail portion 65 with rail portions 65a, 65b connects the accessory supply rails 58a, 58b with the accessory rails 59a, 59b, respectively. Once the accessory 56 is positioned on the accessory handling means 55, the bridging rail portion 55 is removed in order to allow raising of the accessory handling means 55.

Figure 4A:
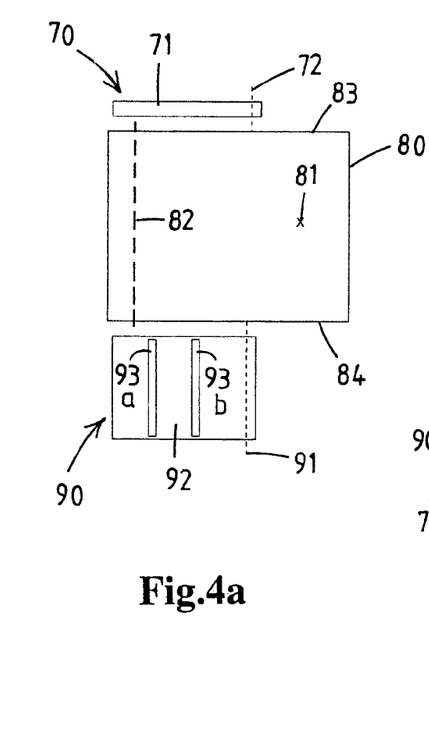
FIGS. 4a-4c show three alternative embodiments of the third aspect of the invention in a view from above.
Figure 4B:
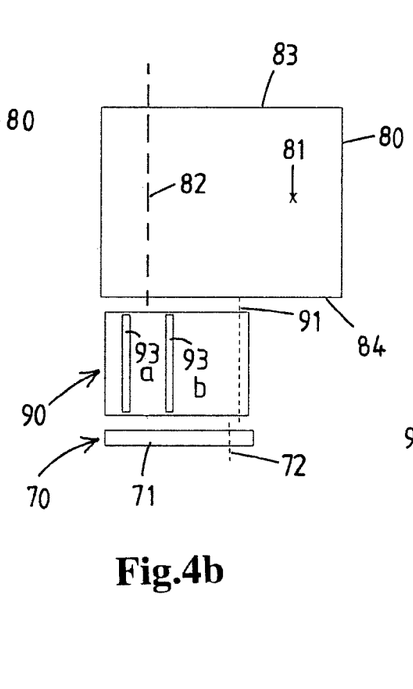
Figure 4C:
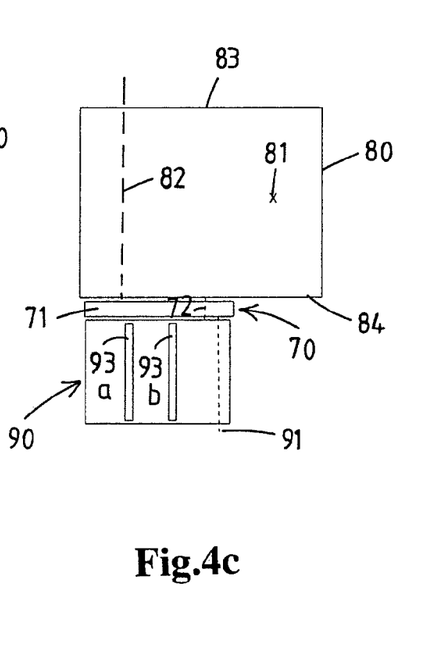

In FIGS. 4a-4c three alternative embodiments of the third aspect of the invention are shown very schematically.

A tower 80 is shown with a firing line 81 extending along the tower. The tower is supported by a support (not shown), which is preferably a vessel, e.g. a pipelaying vessel. J-lay tower structure bearing means (not shown) are provided which allow for the pivoting of the J-lay tower structure with respect to the support about at least one J-lay tower pivot axis 82; the J-lay tower pivot axis defining a first and second side 83, 84 of the J-lay tower structure, each side extending essentially perpendicular to the J-lay tower pivot axis 82.

According to the invention, a tubular and accessory handling system is provided, for transporting a tubular (not shown) between an essentially horizontal tubular supply position and the firing line 51, and for transporting an accessory (not shown) between an essentially horizontal accessory supply position and the firing line.

The tubular and accessory handling system comprises a tubulars supply system (not shown), preferably provided on the support, for supplying tubulars to an essentially horizontal tubular supply position in the vicinity of the tower, and a loader device 70 for transporting a tubular between the essentially horizontal supply position and the firing line.

The loader device 70 comprises:
- a tubular gripper (not shown) adapted for gripping the tubular,
- a base (not shown), preferably provided on the support,
- a boom 71 to which the one or more tubular grippers are attached, which boom is pivotable with respect to the base in a boom pivot direction about a horizontal boom pivot axis 72, between a lowered position for gripping a tubular in the essentially horizontal tubular supply position (the position shown in FIGS. 3a-3c), and a raised position for delivering a tubular to the firing line 81 and vice versa.

The tubular and accessory handling system further comprises an accessory supply system (not shown), preferably also provided on the support, for supplying an accessory (not shown) to an essentially horizontal accessory supply position in the vicinity of the tower 80.

Accessory handling means 90 are provided for handling the accessory (not shown). The accessory handling means 90 comprise a base (not shown), preferably provided on the support, and a pivotable accessory handling arm 92 to which the accessory is attachable, which accessory handling arm is pivotable with respect to the base in an accessory arm pivot direction about a horizontal accessory handling arm pivot axis 91, between a lowered position (as shown in FIGS. 3a-3c) for receiving the accessory in the essentially horizontal accessory supply position, and a raised position (not shown) for delivering the accessory to the firing line 81 and vice versa.

According to the third aspect of the invention, the boom pivot axis 72 is essentially parallel to the accessory handling arm pivot axis 91 and the J-lay tower pivot axis 82, and the boom pivot axis 72 and the accessory handling arm pivot axis 91 are provided adjacent the first and/or second side of the J-lay tower structure.

In all shown embodiments, the accessory handing arm 92 and the boom 71 in their lowered positions point in the same direction. Alternatively, they point in opposite directions.

The embodiments shown in FIGS. 3a-3c differ in that in FIG. 3a the accessory handling means 90 and the pipe loader device 70 are provided at opposite sides 83, 84 of the tower 80, and in FIGS. 3b and 3c the accessory handling means 90 and the pipe loader device 70 are provided at the same side 84 of the tower 80. In FIG. 3b the pipe loader device 70 is provided most remote from the tower 80, while in FIG. 3c the accessory handling means 90 are provided most remote from the tower 80.

In the shown embodiment, the accessory handling means 90 comprise accessory rails 93a, 93b attached to the accessory handling arm 92. According to a preferred embodiment, the tower is provided with tower rails (not shown), and the accessory rails 93a, 93b adjoin the tower rails in the raised position of the loader device, such that the accessory can be transferred from the accessory handling means via the accessory rails and the tower rails to the firing line 81.

The invention claimed is:

1. A tubular installation system for J-laying tubulars said system comprising:
   a J-lay tower structure for lowering and/or raising a tubular or an accessory along a firing line extending along the J-lay tower structure;
   a support for supporting the J-lay tower structure;
   a tubulars supply system for supplying tubulars to an essentially horizontal tubular supply position in the vicinity of the tower, J-lay tower structure;
   a loader device for transporting a tubular between the essentially horizontal supply position and the firing line, wherein the loader device comprises:
      one or more tubular grippers adapted for gripping the tubular;
      a base; and
      a boom to which the one or more tubular grippers are attached, said boom being pivotable with respect to the base in a boom pivot direction about a horizontal boom pivot axis, between a lowered position for gripping a tubular in an essentially horizontal tubular supply position, and a raised position for delivering a tubular to the firing line and vice versa;
   an accessory supply system for supplying an accessory to an essentially horizontal accessory supply position in the vicinity of the J-lay tower structure; and
   an accessory handling mechanism configured to transport the accessory between the essentially horizontal accessory supply position and the firing line,
   wherein the accessory handling mechanism is distinct from the one or more tubular grippers and is attached to the boom of the loader device, at a different position than the one or more tubular grippers, such that the loader device can be used as desired for transporting a tubular or an accessory between the respective supply position and the firing line.

2. The tubular installation system according to claim 1, wherein the accessory handling mechanism comprises accessory rails attached to the boom of the loader device, and wherein the J-lay tower structure is provided with tower rails, wherein the accessory rails adjoin the tower rails in the raised position of the loader device, such that the accessory can be transferred between the accessory handling mechanism and the firing line via the accessory rails and the tower rails.

3. The tubular installation system according to claim 2, wherein an accessory line-up tool is provided to which the accessory is attached, the accessory line-up tool being allowed to move over the accessory rails and the tower rails.

4. The tubular installation system according to claim 2, wherein an accessory handling frame is provided to which the accessory is attached, the accessory handling frame being allowed to move over the accessory rails and the tower rails.

5. The tubular installation system according to claim 1, wherein the one or more grippers are pivotably attached to the boom about a gripper rotation axis essentially parallel to the boom.

6. A drilling rig comprising the tubular installation system according to claim 1, wherein the J-lay tower structure comprises a drilling rig structure, and wherein the lifting device comprises a hoisting device for raising and lowering a string of interconnected tubulars.

7. A marine pipelay system comprising the tubular installation system according to claim 1, wherein the J-lay tower structure is a pipelay tower.

8. A tubular installation system for J-laying tubulars said system comprising:
   a J-lay tower structure for lowering and/or raising a tubular or an accessory along a firing line extending along the J-lay tower structure;
   a support for supporting the J-lay tower structure;
   a tubulars supply system for supplying tubulars to an essentially horizontal tubular supply position in the vicinity of the J-lay tower structure;
   a loader device for transporting a tubular between an essentially horizontal supply position and the firing line, wherein the loader device comprises:
      one or more tubular grippers adapted for gripping the tubular;
      a base; and
      a boom to which the one or more tubular grippers are attached, said boom being pivotable with respect to the base in a boom pivot direction about a horizontal boom pivot axis, between a lowered position for gripping a tubular in the essentially horizontal tubular supply position, and a raised position for delivering a tubular to the firing line and vice versa;
   an accessory supply system for supplying an accessory to an essentially horizontal accessory supply position in the vicinity of the J-lay tower structure; and
   an accessory handling mechanism configured to transport the accessory between the essentially horizontal accessory supply position and the firing line,
   wherein the accessory supply system comprises accessory supply rails, provided on the support, and the accessory supply rails are in line with the accessory handling mechanism.

9. The tubular installation system according to claim 8, wherein the accessory handling mechanism is pivotable about a horizontal accessory pivot axis between a lowered position for receiving the accessory in the essentially horizontal supply position and a raised position for delivering the accessory to the firing line and vice versa, wherein the accessory supply rails are provided perpendicular to and adjacent to the horizontal accessory pivot axis, and a removable bridging rail portion is provided essentially above the horizontal accessory pivot axis between the accessory supply rails and the accessory supply position, the bridging rail portion being removable in order to allow raising of the accessory handling mechanism.

10. The tubular installation system according to claim 8, wherein the accessory handling mechanism is pivotable about a horizontal accessory pivot axis between a lowered position for receiving the accessory in the essentially horizontal supply position and a raised position for delivering the accessory to the firing line and vice versa, and wherein the accessory handling mechanism comprises a base and a pivotable accessory handling arm to which the accessory is attached, the accessory handling arm being pivotable with respect to the base in an accessory arm pivot direction about the horizontal accessory pivot axis.

11. The tubular installation system according to claim 8, wherein the accessory handling mechanism is distinct from the one or more tubular grippers and is attached to the boom of the loader device, at a different position than the one or more tubular grippers, such that the loader device can be used as desired for transporting a tubular or an accessory between the respective supply position and the firing line.

12. A drilling rig comprising the tubular installation system according to claim 8, wherein the J-lay tower structure comprises a drilling rig structure, and wherein the lifting device comprises a hoisting device for raising and lowering a string of interconnected tubulars.

13. A marine pipelay system comprising the tubular installation system according to claim 8, wherein the J-lay tower structure is a pipelay tower.

14. A tubular installation system for J-laying tubulars wherein the system comprises:
   a support;
   a J-lay tower structure for lowering and/or raising a tubular or an accessory along a firing line extending along the J-lay tower structure;
   a J-lay tower structure bearing mechanism configured to allow for the pivoting of the J-lay tower structure with respect to the support about at least one J-lay tower pivot axis; the J-lay tower pivot axis defining a first and second side of the J-lay tower structure, extending perpendicular to the J-lay tower pivot axis;
   a tubulars supply system for supplying tubulars to an essentially horizontal tubular supply position in the vicinity of the J-lay tower structure;
   a loader device for transporting a tubular between an essentially horizontal supply position and the firing line, wherein the loader device comprises:
      one or more tubular grippers adapted for gripping the tubular;
      a base; and
      a boom to which the one or more tubular grippers are attached, said boom being pivotable with respect to the base in a boom pivot direction about a horizontal boom pivot axis, between a lowered position for gripping a tubular in the essentially horizontal tubular supply position, and a raised position for delivering a tubular to the firing line and vice versa;
   an accessory supply system for supplying an accessory to an essentially horizontal accessory supply position in the vicinity of the tower; and
   accessory handling mechanism configured to handle the accessory, wherein the accessory handling mechanism comprises a base and a pivotable accessory handling arm to which the accessory is attached, the accessory handling arm being pivotable with respect to the base in an accessory arm pivot direction about a horizontal accessory handling arm pivot axis, between a lowered position for receiving the accessory in an essentially horizontal accessory supply position, and a raised position for delivering the accessory to the firing line and vice versa,
   wherein the boom pivot axis is essentially parallel to the accessory handling arm pivot axis and to the J-lay tower pivot axis, and wherein the boom pivot axis and the accessory handling arm pivot axis are provided adjacent the first and/or second side of the J-lay tower structure.

15. The tubular installation system according to claim 14 wherein the accessory handing arm and the boom, in their lowered positions, point in the same direction.

16. The tubular installation system according to claim 14, wherein the accessory handling mechanism comprises accessory rails attached to the accessory handling arm, and wherein the J-lay tower structure is provided with tower rails, wherein the accessory rails adjoin the tower rails in the raised position of the loader device, such that the accessory can be transferred from the accessory handling mechanism via the accessory rails and the tower rails to the firing line.

17. The tubular installation system according to claim 16, wherein the accessory handling mechanism comprises an accessory handling frame to which the accessory is attached, the accessory handling frame being allowed to move over the accessory rails and the tower rails.

18. The tubular installation system according to claim 16, wherein the accessory handling mechanism comprises an accessory line-up tool to which the accessory is attached, the accessory line-up tool being allowed to move over the accessory rails and the tower rails.

19. A drilling rig comprising the tubular installation system according to claim 14, wherein the J-lay tower structure comprises a drilling rig structure, and wherein the lifting device comprises a hoisting device for raising and lowering a string of interconnected tubulars.

20. A marine pipelay system comprising the tubular installation system according to claim 14, wherein the J-lay tower structure is a pipelay tower.

\* \* \* \* \*